(12) United States Patent
Oyagi et al.

(10) Patent No.: US 12,475,782 B2
(45) Date of Patent: Nov. 18, 2025

(54) CONTROL DEVICE, RECORDING MEDIUM, AND DATA GENERATION METHOD

(71) Applicant: TOYOTA JIDOSHA KABUSHIKI KAISHA, Toyota (JP)

(72) Inventors: Hiroshi Oyagi, Kyoto (JP); Masaki Ito, Toyota (JP); Yuki Takahashi, Sunto-gun Shizuoka (JP); Koji Ide, Gotemba (JP); Tomohiro Kaneko, Mishima (JP); Yoshihisa Shinoda, Sunto-gun Shizuoka (JP); Shigeki Nakayama, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 18/228,776

(22) Filed: Aug. 1, 2023

(65) Prior Publication Data

US 2024/0046780 A1 Feb. 8, 2024

(30) Foreign Application Priority Data

Aug. 3, 2022 (JP) .................................. 2022-124363

(51) Int. Cl.
*G08G 1/01* (2006.01)
*G01C 21/00* (2006.01)
*G06V 20/58* (2022.01)

(52) U.S. Cl.
CPC ....... *G08G 1/0125* (2013.01); *G01C 21/3815* (2020.08); *G01C 21/3837* (2020.08); *G06V 20/582* (2022.01)

(58) Field of Classification Search
None
See application file for complete search history.

(56) References Cited

U.S. PATENT DOCUMENTS

| 8,527,199 | B1 * | 9/2013 | Burnette | G01C 21/3848 |
| | | | | 701/425 |
| 2015/0142306 | A1 | 5/2015 | Kanematsu | |
| 2018/0293466 | A1 * | 10/2018 | Viswanathan | G01C 21/3602 |
| 2020/0035094 | A1 * | 1/2020 | Ekin | G08G 1/0175 |
| 2022/0238014 | A1 * | 7/2022 | Ringne | G08G 1/054 |
| 2024/0355197 | A1 * | 10/2024 | Takano | G01S 7/497 |

FOREIGN PATENT DOCUMENTS

JP 2013-250228 A 12/2013

\* cited by examiner

*Primary Examiner* — Peter D Nolan
*Assistant Examiner* — Jacob Kent Besteman-Street
(74) *Attorney, Agent, or Firm* — Dinsmore & Shohl LLP

(57) ABSTRACT

A control device includes a processor that acquires travel data of a target vehicle, determines whether the target vehicle obeys a traffic rule, and adjusts a usage form of the travel data in a case of determining that the target vehicle does not obey the traffic rule.

10 Claims, 8 Drawing Sheets

CONTROL DEVICE, RECORDING MEDIUM, AND DATA GENERATION METHOD

CROSS-REFERENCE TO RELATED APPLICATION(S)

The present application claims priority to and incorporates by reference the entire contents of Japanese Patent Application No. 2022-124363 filed in Japan on Aug. 3, 2022.

BACKGROUND

The present disclosure relates to a control device, a recording medium, and a data generation method.

Japanese Laid-open Patent Publication No. 2013-250228 discloses a technique of a road learning device that, in a case where a vehicle travels on an unregistered road that is not stored in existing map data, creates a travel trajectory of the unregistered road from traveling data of the vehicle that has traveled on the unregistered road, performs correction or the like on the travel trajectory, and updates the existing map data.

SUMMARY

There is a need for providing a control unit, program, and a data generation method capable of obtaining a route that allows traveling while traffic rules are obeyed.

According to an embodiment, a control device includes a processor that acquires travel data of a target vehicle, determines whether the target vehicle obeys a traffic rule, and adjusts a usage form of the travel data in a case of determining that the target vehicle does not obey the traffic rule.

According to an embodiment, a non-transitory computer-readable recording medium stores a program that causes a processor to acquire travel data of a target vehicle, determine whether the target vehicle obeys a traffic rule, and adjust a usage form of the travel data in a case of determining that the target vehicle does not obeys the traffic rule.

According to an embodiment, a data generation method performed by a processor, includes: acquiring travel data of a target vehicle; determining whether the target vehicle obeys a traffic rule; and adjusting a usage form of the travel data in a case of determining that the target vehicle does not obey the traffic rule.

DETAILED DESCRIPTION

In the related art, in the technique as in Laid-open Patent Publication No. 2013-250228 has a problem that, in a case of creating an unregistered road or creating a passable road at the time of a disaster or the like, when there is an illegal vehicle that has illegally passed in violation of the traffic rules or the like, traveling data from the illegal vehicle is acquired and map data is inadequately updated.

Hereinbelow, a control device according to each embodiment of the present disclosure will be described with reference to the drawings. Note that the present disclosure is not limited to the following embodiments. Also, in the following description, similar components are labeled with the same reference signs.

First Embodiment

Functional Configuration of Control Device

Figure 1:
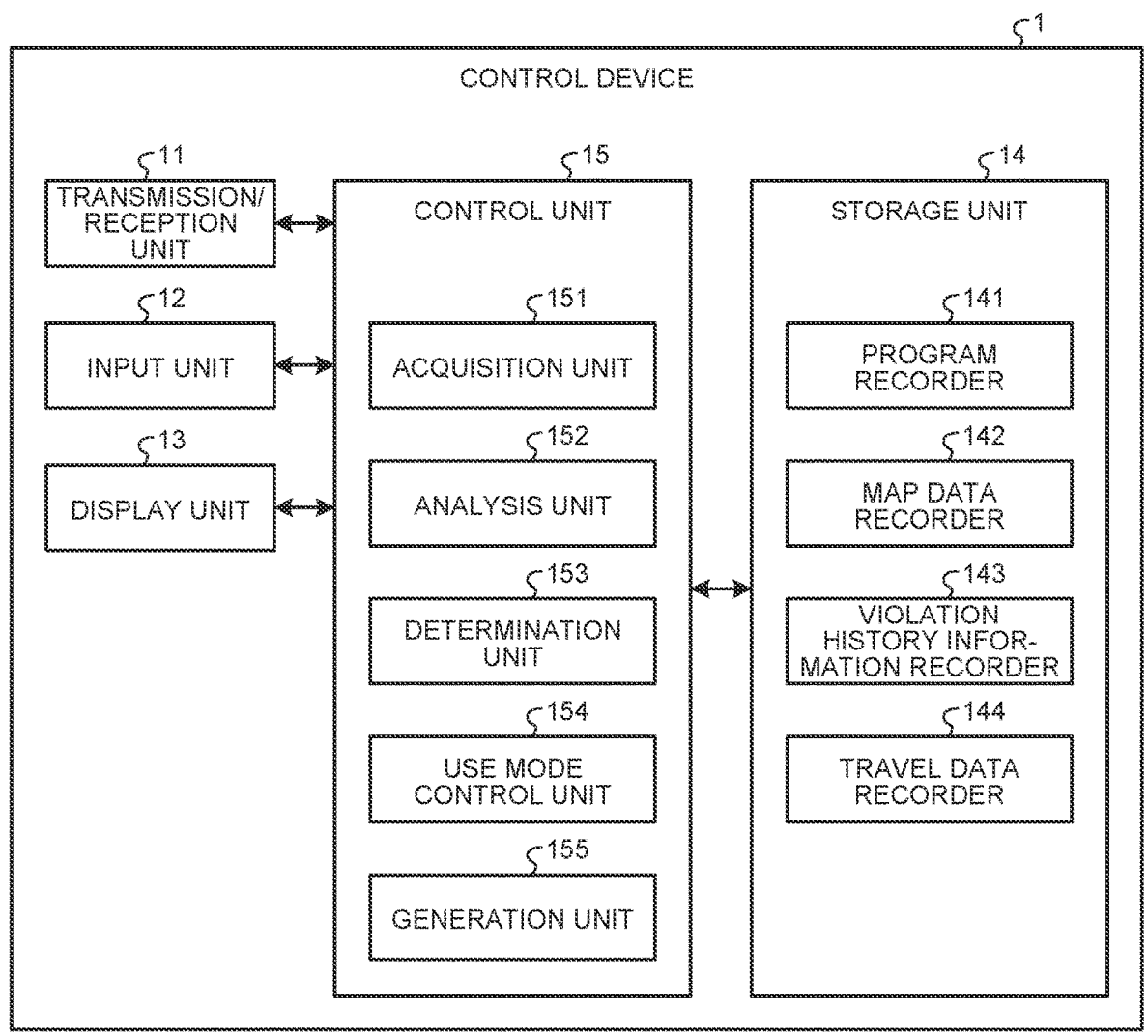
FIG. 1 is a block diagram illustrating a functional configuration of a control device according to a first embodiment.

FIG. 1 is a block diagram illustrating a functional configuration of a control device according to a first embodiment. A control device 1 illustrated in FIG. 1 is achieved by using a server or the like that communicates with a plurality of vehicles via a network and acquires travel data of the vehicles. The control device 1 includes a transmission/reception unit 11, an input unit 12, a display unit 13, a recorder (storage unit) 14, and a control unit 15.

The transmission/reception unit 11 transmits various types of information to each of a plurality of vehicles via a not-illustrated network and receives various types of data including travel data from each of the plurality of vehicles under the control of the control unit 15. The transmission/reception unit 11 is configured using a communication module or the like capable of transmitting and receiving various types of information.

The input unit 12 is configured using a keyboard, a mouse, a switch, a touch panel, and the like, receives inputs of various operations by a user, and outputs information corresponding to the received operations to the control unit 15.

The display unit 13 displays various types of information regarding the control device 1 under the control of the control unit 15. The display unit 13 is configured using a display such as a liquid crystal display and an organic electroluminescent display (organic EL display).

The recorder 14 is configured using a dynamic random access memory (DRAM), a read only memory (ROM), a flash memory, a hard disk drive (HDD), a solid state drive (SSD), and the like, and records various types of information regarding the control device 1. Also, the recorder 14 includes a program recorder 141 that records various programs executed by the control device 1, a map data recorder 142 that records map data, a violation history information recorder 143 that associates identification information (vehicle ID) that identifies a vehicle with a violation history, and a travel data recorder 144 that records travel data acquired from each of the plurality of vehicles.

The control unit 15 is configured using a memory and a processor including hardware such as a central processing unit (CPU), a field-programmable gate array (FPGA), and an application specific integrated circuit (ASIC). The control unit 15 controls each of the units constituting the control device 1. In addition, the control unit 15 reads and executes the program recorded in the program recorder 141 in the working area of the memory, and controls each of the components and the like through the execution of the program by the processor, whereby the hardware and the software cooperate with each other to achieve a functional module matching a predetermined purpose. Specifically, the control unit 15 includes, as functional modules, an acquisition unit 151, an analysis unit 152, a determination unit 153, a use mode control unit 154, and a generation unit 155.

The acquisition unit 151 acquires travel data of a target vehicle from each of the plurality of vehicles via the transmission/reception unit 11. Here, the travel data includes a travel trajectory of the target vehicle, image data generated by a driving recorder that is provided at the front and the rear of the target vehicle and images a front view and a rear view from the target vehicle, a camera that images a view in a traveling direction (forward direction) of the target vehicle, or the like, positional information of the target vehicle, a detection result of a sign detected by an electronic control unit (ECU) or the like of the target vehicle, detection data detected by various sensors of the target vehicle such as an acceleration sensor and a speed sensor, identification information of the vehicle, and the like.

The analysis unit 152 performs image analysis on the travel data of the target vehicle acquired by the acquisition unit 151. Specifically, the analysis unit 152 detects a road sign, a signboard, and a travel lane from the image data included in the travel data of the target vehicle and analyzes a travel state of the target vehicle by using a pre-trained model generated by known machine learning such as pattern matching and deep learning.

The determination unit 153 determines, on the basis of the analysis result of the analysis unit 152, whether the target vehicle of the travel data acquired by the acquisition unit 151 observes (obeys) the traffic rules. Specifically, the determination unit 153 determines whether the target vehicle observes the traffic rules on the basis of the analysis result of the analysis unit 152, the positional information included in the travel data, and the map data recorded in the map data recorder 142. For example, the determination unit 153 determines whether the target vehicle observes the traffic rules without traveling on a closed road, traveling in a way that is prohibited by a sign, or traveling on a road exceeding the legal speed limit on the basis of the analysis result of the analysis unit 152, the positional information included in the travel data of the target vehicle, and the map data recorded in the map data recorder 142.

The use mode control unit 154 adjusts a use mode (usage form) of the travel data in a case where the determination unit 153 determines that the target vehicle does not observe the traffic rules. Specifically, in a case where the determination unit 153 determines that the target vehicle does not observe the traffic rules, the use mode control unit 154 does not accept the travel data of the target vehicle as travel data for use in generating map information because the target vehicle does not observe the traffic rules. On the other hand, in a case where the determination unit 153 determines that the target vehicle observes the traffic rules, the use mode control unit 154 accepts the travel data of the target vehicle as travel data for use in generating map information because the target vehicle observes the traffic rules.

In a case of determining that the target vehicle observes the traffic rules, the generation unit 155 generates map information indicating a route on which vehicles can travel on the basis of the travel data of the target vehicle. Specifically, in a case of determining that the target vehicle observes the traffic rules, the generation unit 155 generates, as map information, an unregistered road and a passable road at the time of a disaster or the like on the map corresponding to the map information recorded in the map data recorder 142 on the basis of the travel data of the target vehicle.

Processing of Control Device

Figure 2:
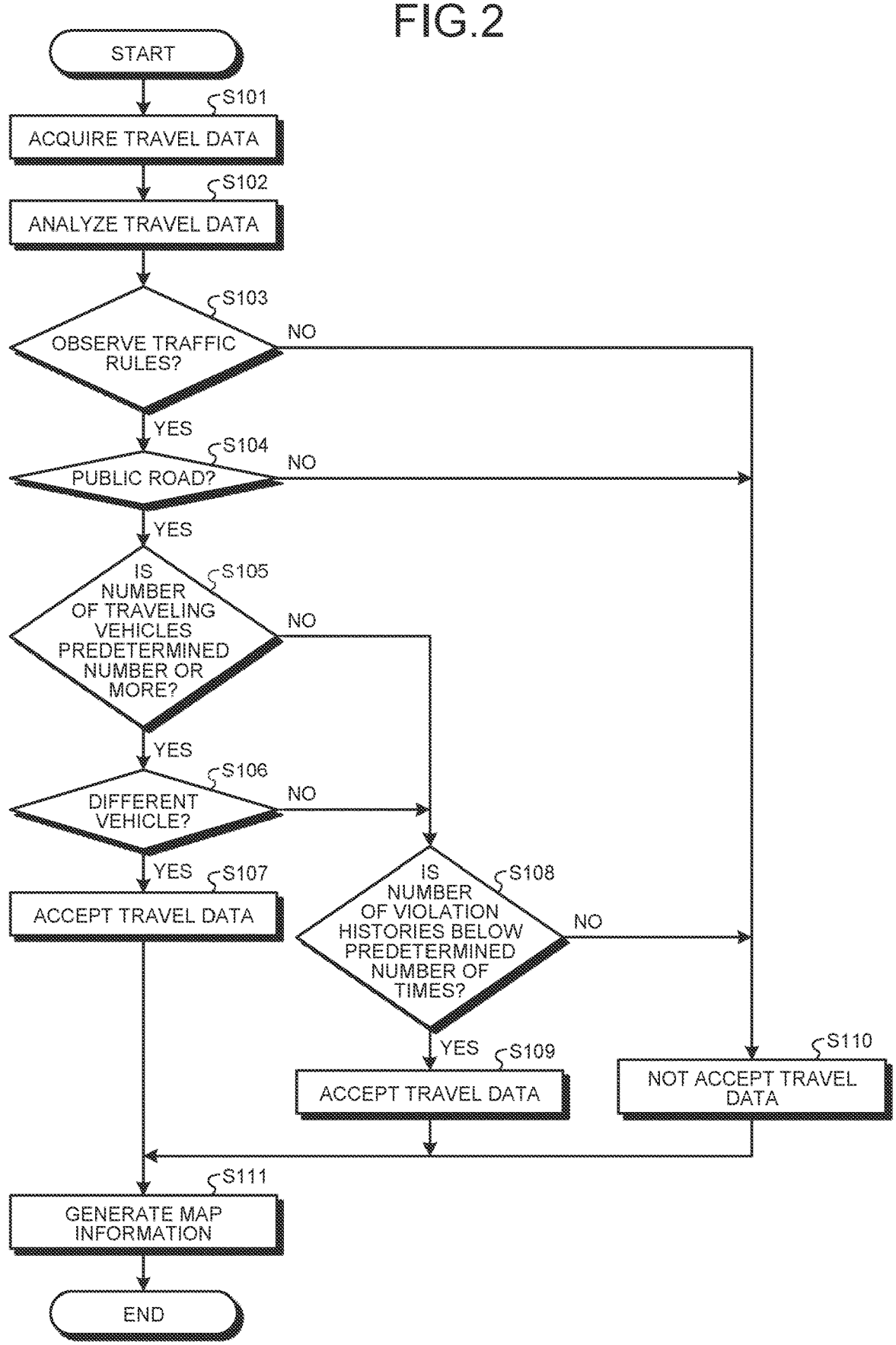
FIG. 2 is a flowchart illustrating an overview of processing executed by the control device according to the first embodiment.

Next, processing executed by the control device 1 will be described. FIG. 2 is a flowchart illustrating an overview of processing executed by the control device 1.

As illustrated in FIG. 2, first, the acquisition unit 151 acquires travel data from the target vehicle via the transmission/reception unit 11 (Step S101).

Subsequently, the analysis unit 152 analyzes the travel data of the target vehicle acquired by the acquisition unit 151 (Step S102). Specifically, the analysis unit 152 analyzes a road sign, a signboard, a travel lane, and a travel state of the target vehicle included in the travel data by using a pre-trained model generated by known machine learning such as pattern matching and deep learning. After Step S102, the control device 1 proceeds to Step S103 described below.

Figure 3:
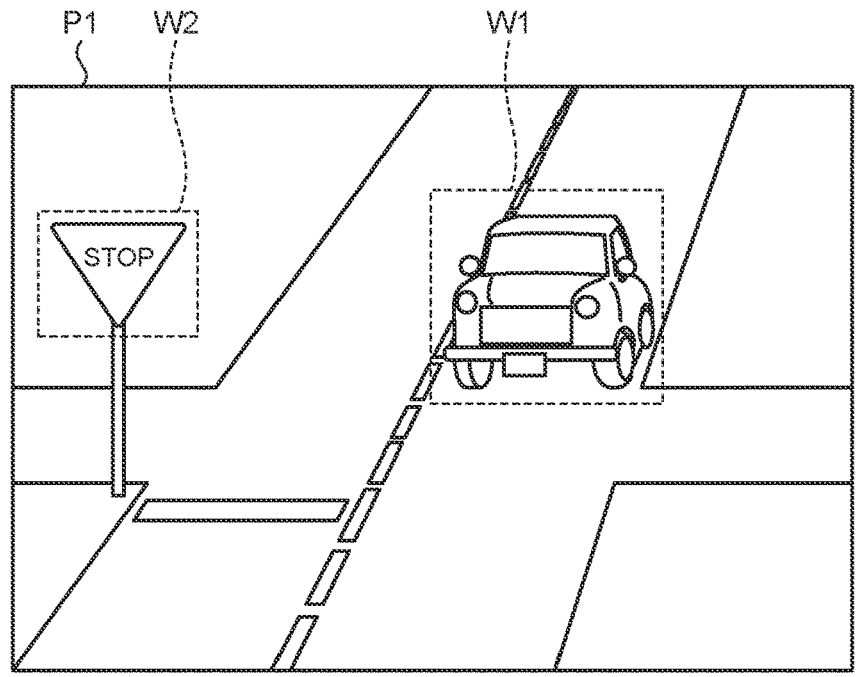
FIG. 3 is a diagram illustrating an example of a captured image corresponding to image data included in travel data analyzed by an analysis unit according to the first embodiment.
Figure 4:
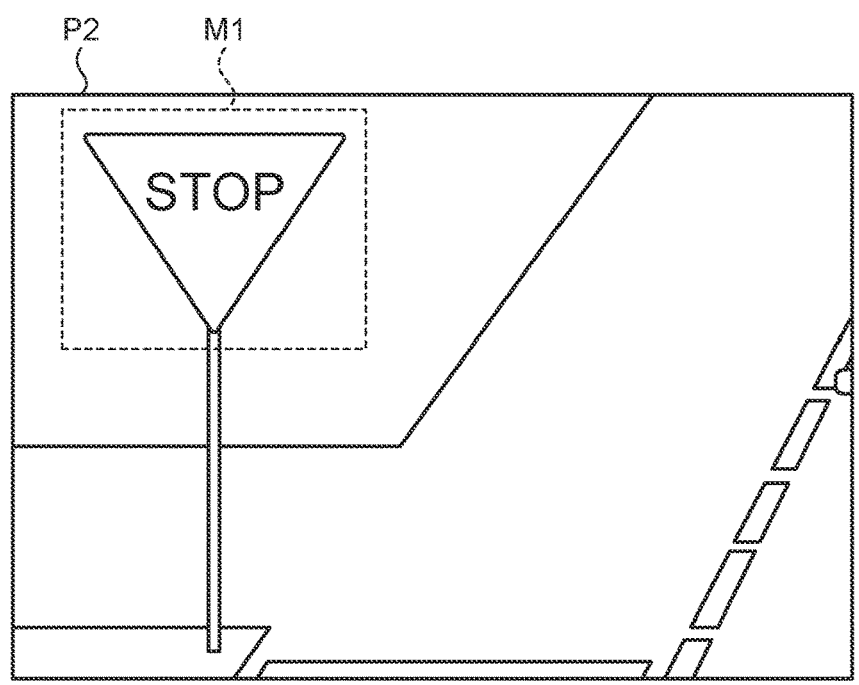
FIG. 4 is an enlarged view of a region in FIG. 3.

FIG. 3 is a diagram illustrating an example of a captured image corresponding to image data included in travel data analyzed by the analysis unit 152. FIG. 4 is an enlarged view of a region W2 in FIG. 3.

As illustrated in FIG. 3, the analysis unit 152 detects a region W1 including a front surface of an oncoming vehicle and the region W2 including a sign from a captured image P1 using the pre-trained model or the known technique. Then, the analysis unit 152 analyzes the contents of the regions W1 and W2 using the pre-trained model or the known pattern matching technique. In this case, the analysis unit 152 detects content appearing in the region W1 as an oncoming vehicle, and detects content in the region W2 as a sign. At this time, the analysis unit 152 further analyzes an object related to the traffic rules. Specifically, as illustrated in FIG. 4, the analysis unit 152 analyzes the content of the sign in the region W2 of image P2, and detects that a sign M1 included in the region W2 represents temporary stop, using the pre-trained model or the known technique.

Figure 5:
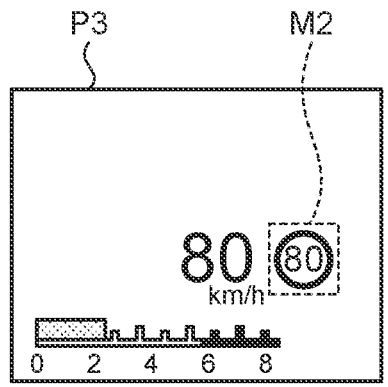
FIG. 5 is a diagram illustrating an example of a recognition result by a vehicle included in the travel data analyzed by the analysis unit according to the first embodiment.
Figure 6:
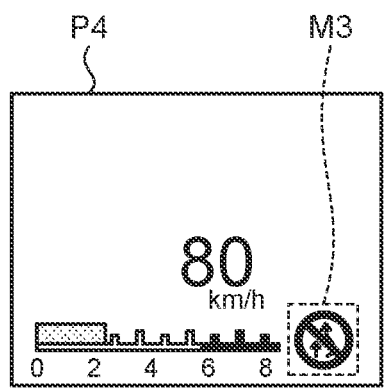
FIG. 6 is a diagram illustrating another example of the recognition result by the vehicle included in the travel data analyzed by the analysis unit according to the first embodiment.
Figure 7:
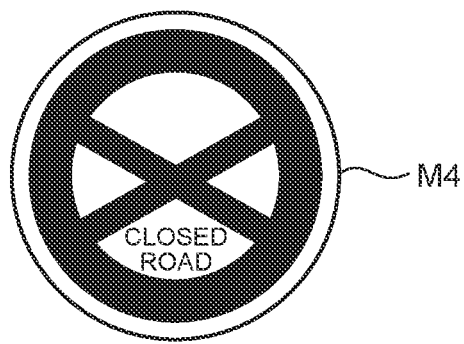
FIG. 7 is a diagram illustrating an example of a road sign.

FIG. 5 is a diagram illustrating an example of a recognition result by the vehicle included in the travel data analyzed by the analysis unit 152. FIG. 6 is a diagram illustrating another example of the recognition result by the vehicle included in the travel data analyzed by the analysis unit 152. FIG. 7 is a diagram illustrating an example of a road sign.

As illustrated in each of an image P3 of FIG. 5 and an image P4 of FIG. 6, the analysis unit 152 detects a road sign of a road on which the vehicle travels on the basis of each of road signs M2 and M3, which is the recognition result recognized by the vehicle. For example, in the case of the road sign M2 in the image P3 in FIG. 5, the analysis unit 152 detects that the maximum traveling speed of the road on which the vehicle travels is 80 km/h. Further, in the case of the road sign M3 in the image P4 of FIG. 6, the analysis unit 152 detects that the road on which the vehicle travels prohibits swerving. In addition, in the case of the sign M4 in FIG. 7, the analysis unit 152 detects that the road is closed to vehicles.

Figure 8:
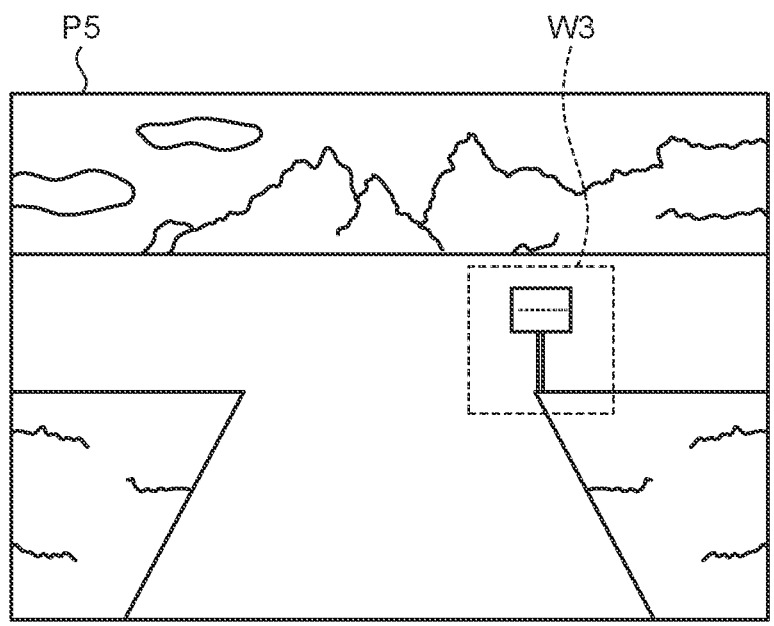
FIG. 8 is a diagram illustrating an example of a captured image corresponding to image data included in the travel data analyzed by the analysis unit according to the first embodiment.
Figure 9:
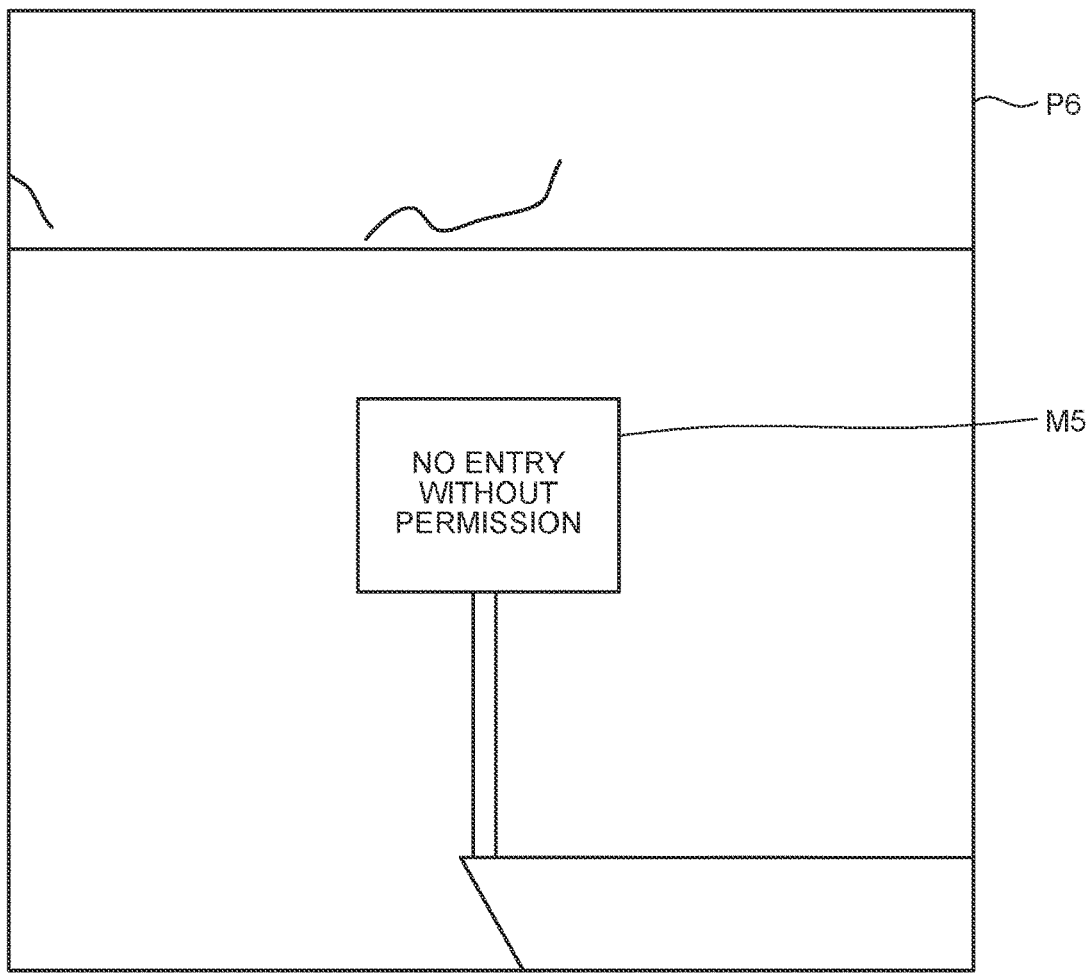
FIG. 9 is an enlarged view of a region in FIG. 8.

FIG. 8 is a diagram illustrating an example of a captured image corresponding to image data included in travel data analyzed by the analysis unit 152. FIG. 9 is an enlarged view of a region W3 in FIG. 8. As illustrated in FIGS. 8 and 9, the analysis unit 152 detects the region W3 including a signboard from an image P5, and analyzes characters written on the signboard in the region W3. In this case, as illustrated in FIG. 9, the analysis unit 152 detects that a signboard M5 represents no entry without permission in image P6, and detects that the place beyond this point is not a public road but a private land.

Returning to FIG. 2, the description of Step S103 and subsequent steps will be continued.

In Step S103, the determination unit 153 determines whether the target vehicle observes the traffic rules on the basis of the analysis result of the analysis unit 152, the positional information included in the travel data, and the map data recorded in the map data recorder 142. Specifically, the determination unit 153 determines whether the target vehicle observes the traffic rules without traveling on a closed road or traveling on a road exceeding the legal speed limit on the basis of the analysis result of the analysis unit 152, the positional information included in the travel data, and the map data recorded in the map data recorder 142. In a case where the determination unit 153 determines that the target vehicle observes the traffic rules (Step S103: Yes), the control device 1 proceeds to Step S104 described below. In a case where the determination unit 153 determines that the target vehicle does not observe the traffic rules (Step S103: No), the control device 1 proceeds to Step S110 described below.

Figure 10:
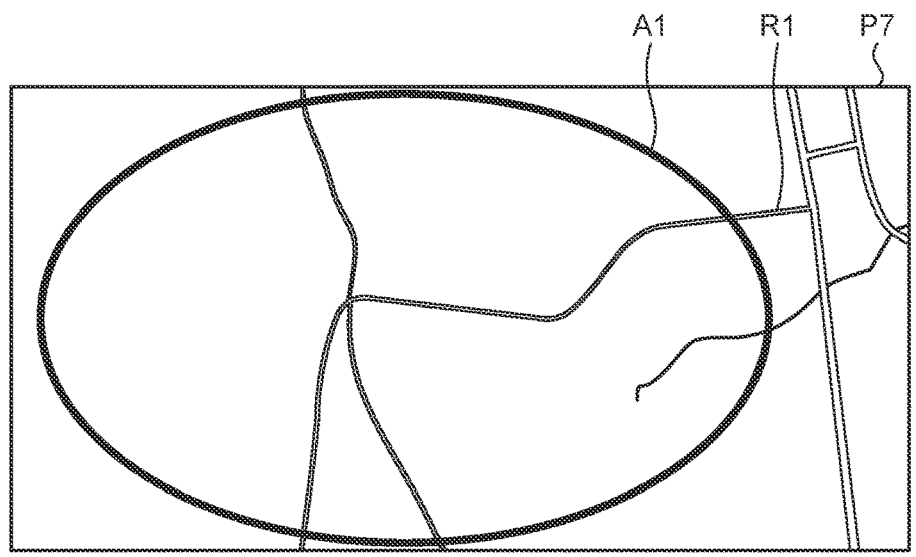
FIG. 10 is a diagram illustrating an example of a map image of a certain private land.

In Step S104, the determination unit 153 determines whether the target vehicle has traveled on a public road on the basis of the travel data of the target vehicle and the map data recorded in the map data recorder 142. That is, the determination unit 153 determines whether the target vehicle is traveling on a private land including a private road. FIG. 10 is a diagram illustrating an example of a map image of a certain private land. In a map image P7 of FIG. 10, a region A1 indicates a private land region. As illustrated in FIG. 10, there is a road R1 in the private land region A1 on the map image P7. Therefore, in a case where the travel data of the target vehicle includes travel data of a travel trajectory on the road R1 in the region A1, and where the private land is incorporated when map information indicating a road on which vehicles have been able to pass described below is created, some misunderstanding may occur on a driver of a different vehicle or the like. In addition, as in the image P5 of FIG. 8 described above, the private land may be opened without providing a gate or the like at the entrance to the private land. Therefore, the determination unit 153 determines whether the target vehicle has traveled on a public road on the basis of the travel data of the target vehicle and the map data recorded in the map data recorder 142, and determines that the target vehicle does not observe the traffic rules in a case of traveling on a private road on a private land. In a case where the determination unit 153 determines that the target vehicle is traveling on a public road (Step S104: Yes), the control device 1 proceeds to Step S105 described below. On the other hand, in a case where the determination unit 153 determines that the target vehicle is not traveling on a public road (Step S104: No), the control device 1 proceeds to Step S110 described below.

In Step S105, on the basis of a group of a plurality of pieces of travel data recorded in the travel data recorder 144, the determination unit 153 determines whether a predetermined number or more of the traveling vehicles have traveled on a predetermined road (route) in the travel route traveled by the target vehicle. Specifically, on the basis of a group of a plurality of pieces of travel data recorded in the travel data recorder 144, the determination unit 153 determines whether a predetermined number or more of the traveling vehicles have traveled on a predetermined road in the travel route on which the target vehicle has traveled. For example, the determination unit 153 determines whether one or more traveling vehicles have traveled on a predetermined road (route) in the traveling route on which the target vehicle has traveled. In a case where the determination unit 153 determines that the predetermined number or more of the traveling vehicles have traveled (Step S105: Yes), the control device 1 proceeds to Step S106 described below. On the other hand, in a case where the determination unit 153 determines that the predetermined number or more of the traveling vehicles have not traveled (Step S105: No), the control device 1 proceeds to Step S108 described below.

In Step S106, the determination unit 153 determines whether the traveling vehicle that has traveled on the travel route of the target vehicle is a different vehicle on the basis of the identification information included in the travel data of the target vehicle and the identification information included in each of the plurality of pieces of travel data recorded in the travel data recorder 144. Specifically, the determination unit 153 determines whether the traveling vehicle is a different vehicle on the basis of the identification information of the target vehicle and the identification information of the traveling vehicle. Then, the determination unit 153 determines that the traveling vehicle is a different vehicle in a case where the identification information of the target vehicle is different from the identification information of the traveling vehicle, and determines that the traveling vehicle is the target vehicle in a case where the identification information of the target vehicle is the same as the identification information of the traveling vehicle. In a case where the determination unit 153 determines that the vehicle that has traveled on the travel route of the target vehicle is the different vehicle (Step S106: Yes), the control device 1 proceeds to Step S107 described below. On the other hand, in a case where the determination unit 153 determines that the vehicle that has traveled on the travel route of the target vehicle is not the different vehicle but the target vehicle (Step S106: No), the control device 1 proceeds to Step S108 described below.

In Step S107, the use mode control unit 154 accepts the travel data of the target vehicle as travel data for use in generating map information because the target vehicle observes the traffic rules. In this case, the use mode control unit 154 stores the travel data of the target vehicle in the travel data recorder 144. After Step S107, the control device 1 proceeds to Step S111 described below.

In Step S108, the determination unit 153 determines whether the number of violation histories of the target vehicle is below a predetermined number of times on the basis of the identification information included in the travel data of the target vehicle and violation history information recorded in the violation history information recorder 143. Specifically, the determination unit 153 determines whether the violation history information recorded in the violation history information recorder 143 includes the same identification information as the identification information of the target vehicle. Then, in a case where the violation history information includes the same identification information as the identification information of the target vehicle, the determination unit 153 determines whether the number of violations associated with the identification information is below a predetermined number of times. In a case where the determination unit 153 determines that the number of the violation histories of the target vehicle is below the predetermined number of times (Step S108: Yes), the control device 1 proceeds to Step S109 described below. On the other hand, in a case where the determination unit 153 determines that the number of the violation histories of the target vehicle is not below the predetermined number of times (Step S108: No), the control device 1 proceeds to Step S110 described below.

In Step S109, the use mode control unit 154 accepts the travel data of the target vehicle as travel data for use in generating map information because the target vehicle observes the traffic rules. After Step S109, the control device 1 proceeds to Step S111 described below.

In Step S110, the use mode control unit 154 does not accept the travel data of the target vehicle as travel data for use in generating map information because the target vehicle does not observe the traffic rules. In this case, the use mode control unit 154 deletes the travel data of the target vehicle recorded in the travel data recorder 144. After Step S110, the control device 1 proceeds to Step S111 described below.

Figure 11:
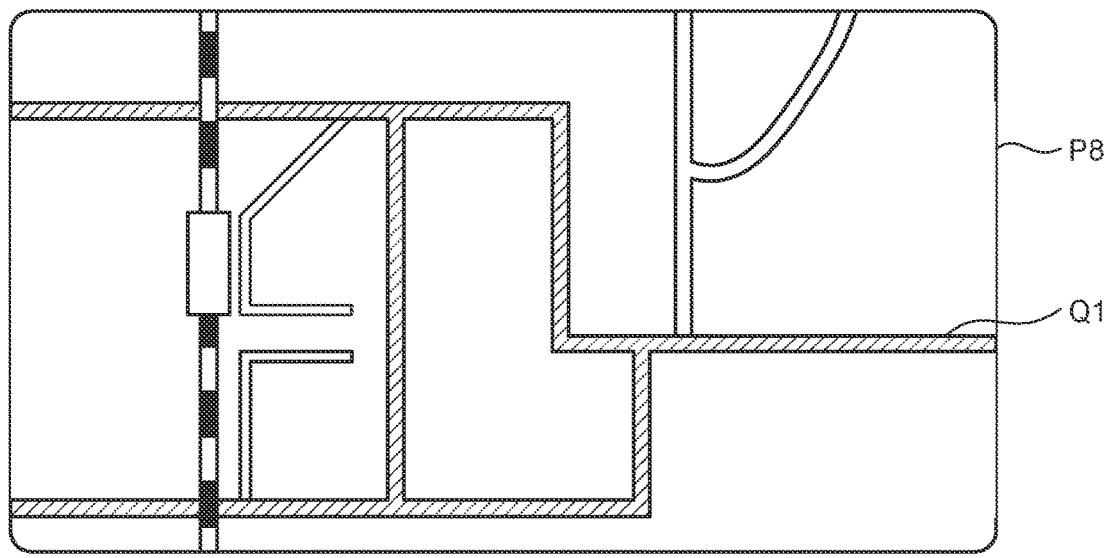
FIG. 11 is a diagram illustrating an example of map information generated by a generation unit according to the first embodiment.

Subsequently, the generation unit 155 generates map information indicating a travel route on which vehicles can pass on the basis of the travel data of the target vehicle recorded in the travel data recorder 144 (Step S111). FIG. 11 is a diagram illustrating an example of map information generated by the generation unit 155. As illustrated in FIG. 11, the generation unit 155 generates map information P8. The map information P8 includes a road Q1 on which vehicles can travel. Note that, in FIG. 11, the road Q1 on which the vehicle has been able to pass is expressed by hatching. After Step S111, the control device 1 ends this processing.

According to the first embodiment described above, in a case where the determination unit 153 determines that the target vehicle does not observe the traffic rules, the use mode control unit 154 adjusts the use mode of the travel data, so that a route of the travel data of the target vehicle that observes the traffic rules can be obtained.

In addition, according to the first embodiment, in a case where the determination unit 153 determines that the target vehicle observes the traffic rules, the use mode control unit 154 accepts the travel data of the target vehicle as travel data for use in generating map information. On the other hand, in a case where the determination unit 153 determines that the target vehicle does not observe the traffic rules, the use mode control unit 154 does not accept the travel data of the target vehicle as travel data for use in generating map information. As a result, the map information using the route of the travel data of the target vehicle that observes the traffic rules can be generated.

Further, according to the first embodiment, the determination unit 153 determines whether the target vehicle observes the traffic rules on the basis of the content of at least one of the sign and the signboard detected by the analysis unit 152. Then, in a case where the determination unit 153 determines that the target vehicle does not observe the traffic rules, the use mode control unit 154 does not accept the travel data of the target vehicle as travel data for use in generating map information. As a result, the map information using the route of the travel data of the target vehicle that observes the traffic rules can be generated.

Further, according to the first embodiment, the determination unit 153 determines whether a predetermined number or more of vehicles have traveled on the road on which the target vehicle has traveled on the basis of the travel data of the target vehicle and the group of the pieces of travel data of the plurality of different vehicles, and determines that the target vehicle observes the traffic rules in a case where it is determined that the predetermined number or more of vehicles have traveled. Then, in a case where the determination unit 153 determines that the target vehicle observes the traffic rules, the use mode control unit 154 accepts the travel data of the target vehicle as travel data for use in generating map information. As a result, it is possible to obtain the route of the travel data of the target vehicle that observes the traffic rules.

Further, according to the first embodiment, the determination unit 153 determines whether the number of the violation histories of the target vehicle is below the predetermined number of times, and in a case where it is determined that the number of the violation histories of the target vehicle is not below the predetermined number of times for a case where it is determined that the predetermined number or more of vehicles have not traveled on the road, it is determined that the target vehicle is traveling on a private road, that is, it is determined that the target vehicle does not observe the traffic rules. Then, in a case where the determination unit 153 determines that the target vehicle does not observe the traffic rules, the use mode control unit 154 does not accept the travel data of the target vehicle as travel data for use in generating map information. As a result, it is possible to obtain the route of the travel data of the target vehicle that observes the traffic rules.

Further, according to the first embodiment, in a case where the determination unit 153 determines that the target vehicle is traveling on the public road, it is determined that the target vehicle observes the traffic rules. Therefore, it is possible to obtain the route of the travel data of the target vehicle that observes the traffic rules.

Further, according to the first embodiment, in a case where the determination unit 153 determines that the target vehicle is traveling on a private road, the travel data of the target vehicle is not accepted as travel data for use in generating map information, and in a case where the determination unit 153 determines that the target vehicle is traveling on a public road, the travel data of the target vehicle is accepted as travel data for use in generating map information. Therefore, the route of the travel data excluding the private road can be obtained.

Further, according to the first embodiment, in a case where the determination unit 153 determines that the target vehicle observes the traffic rules, the generation unit 155 generates the map information indicating the route on which vehicles can travel on the basis of the travel data of the target vehicle, so that the map information in which the traffic rules are observed can be obtained.

Second Embodiment

Next, a second embodiment will be described. In the first embodiment, a case where the control device is provided in the server has been described, but in the second embodiment, a case where the control device is provided in a vehicle will be described.

Functional Configuration of Vehicle

Figure 12:
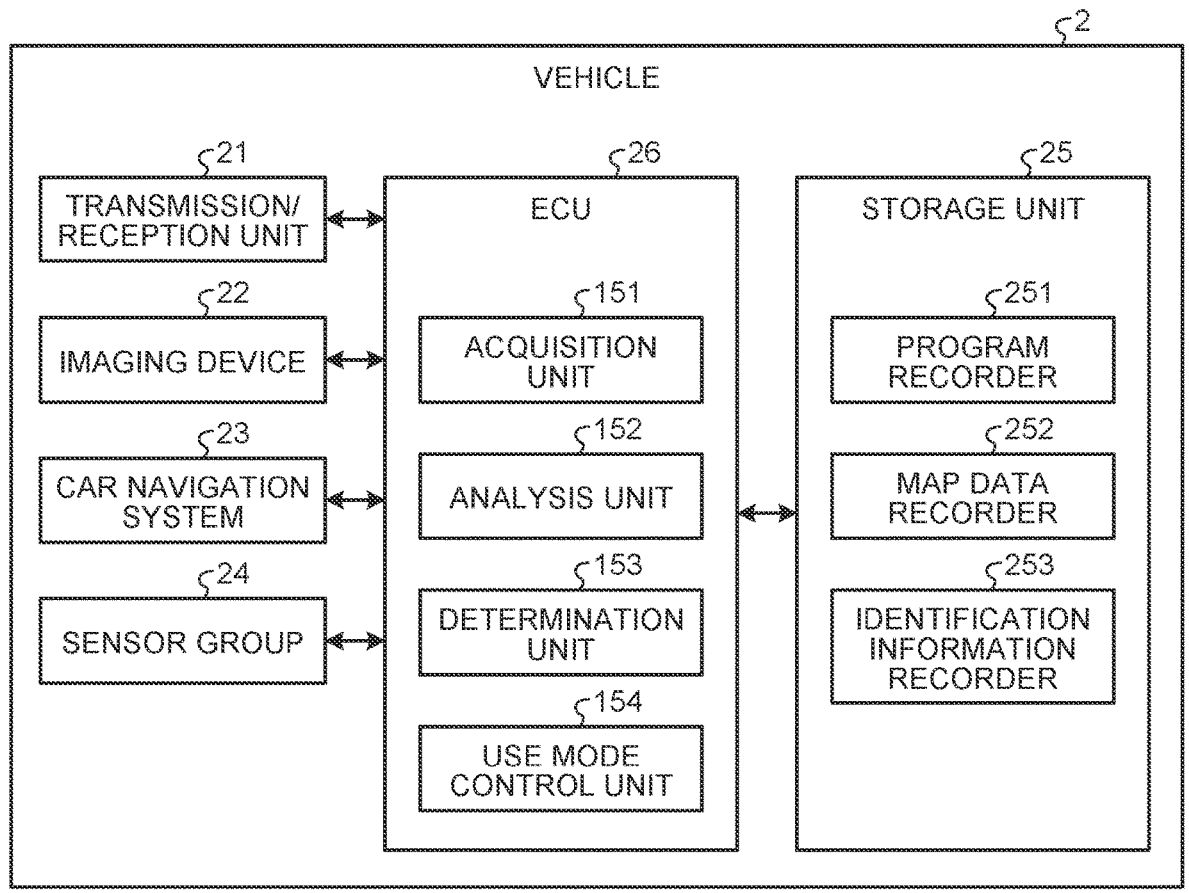
FIG. 12 is a block diagram illustrating a functional configuration of a vehicle according to a second embodiment.

FIG. 12 is a block diagram illustrating a functional configuration of a vehicle according to the second embodiment. A vehicle 2 illustrated in FIG. 12 includes at least a transmission/reception unit 21, an imaging device 22, a car navigation system 23, a sensor group 24, a recorder (storage unit) 25, and an electronic control unit (ECU) 26.

The transmission/reception unit 21 transmits various types of information to an external device such as a server (for example, the control device 1 in FIG. 1) via a not-illustrated network and receives various types of data from the external device under the control of the ECU 26. The transmission/reception unit 21 is configured using a communication module or the like capable of transmitting and receiving various types of information.

The imaging device 22 is configured using an image sensor such as a charge coupled device (CCD) sensor and a complementary metal oxide semiconductor (CMOS) sensor, a lens, and the like. The imaging device 22 is provided at the front side and the rear side of the vehicle 2. The imaging device 22 generates image data by imaging a front view and a rear view while the vehicle 2 is traveling, and outputs the image data to the ECU 26.

The car navigation system 23 is configured using a global positioning system (GPS) sensor or the like, receives signals from a plurality of GPS satellites or transmission antennas, calculates positional information regarding the position (longitude and latitude) of the vehicle 2 on the basis of the received signals, and outputs the positional information to the ECU 26.

The sensor group 24 is configured using a temperature sensor, a fuel sensor, an acceleration sensor, a speed sensor, a gyro sensor, and the like, detects various types of information regarding the vehicle 2, such as speed, and outputs the detection result to the ECU 26.

The recorder 25 is configured using a DRAM, a ROM, a flash memory, an HDD, an SSD, and the like, and records various types of information regarding the vehicle 2. The recorder 25 includes a program recorder 251 that records various programs executed by the ECU 26, a map data recorder 252 that records map data, and an identification information recorder 253 that records identification information (vehicle ID) that identifies the vehicle 2.

The ECU 26 is configured using a memory and a processor including hardware such as a CPU, an FPGA, and an ASIC. The ECU 26 controls each of the units constituting the vehicle 2. In addition, the ECU 26 reads and executes the program recorded in the program recorder 251 in the working area of the memory, and controls each of the components and the like through the execution of the program by the processor, whereby the hardware and the software cooperate with each other to achieve a functional module matching a predetermined purpose. The ECU 26 includes an acquisition unit 151, an analysis unit 152, a determination unit 153, and a use mode control unit 154, which have similar functions to those of the control unit in the first embodiment. Note that, in the second embodiment, the ECU 26 functions as a control device.

Processing Executed by ECU

Figure 13:
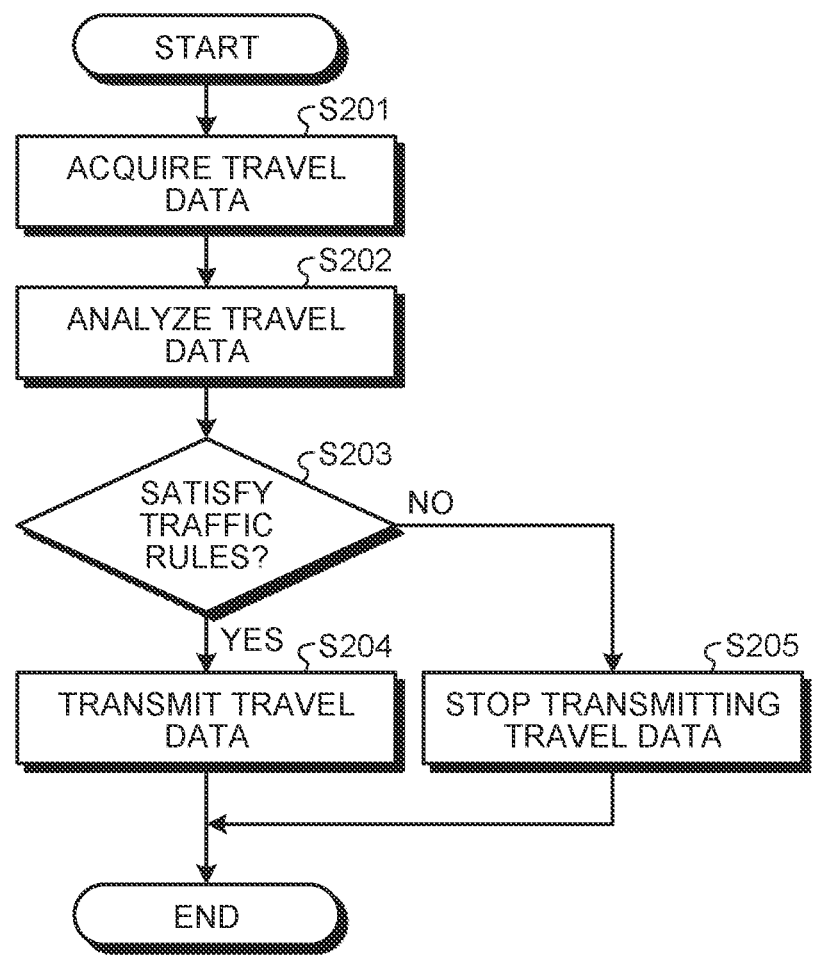
FIG. 13 is a flowchart illustrating an overview of processing executed by an ECU according to the second embodiment.

Next, processing executed by the ECU 26 will be described. FIG. 13 is a flowchart illustrating an overview of processing executed by the vehicle 2.

As illustrated in FIG. 13, first, the acquisition unit 151 acquires travel data including image data generated by the imaging device 22, positional information of the vehicle 2 acquired by the car navigation system 23, and respective detection results detected by the sensor group 24 (Step S201).

Subsequently, the analysis unit 152 analyzes the travel data acquired by the acquisition unit 151 (Step S202). Specifically, the analysis unit 152 analyzes a road sign, a signboard, and a travel lane included in the travel data by using a pre-trained model generated by known machine learning such as pattern matching and deep learning. Note that the analysis of the analysis unit 152 is performed in a similar method described in the first embodiment.

The determination unit 153 determines whether the vehicle 2 observes the traffic rules on the basis of the analysis result of the analysis unit 152, the positional information included in the travel data acquired by the acquisition unit 151, and the map data recorded in the map data recorder 252 (Step S203). In a case where the determination unit 153 determines that the vehicle 2 observes the traffic rules (Step S203: Yes), the ECU 26 proceeds to Step S204 described below. In a case where the determination unit 153 determines that the vehicle does not observe the traffic rules (Step S203: No), the ECU 26 proceeds to Step S205 described below.

In Step S204, the use mode control unit 154 transmits, via the transmission/reception unit 21, the travel data acquired by the acquisition unit 151 to the external device (for example, the control device 1 in the first embodiment) that generates map information of a road on which vehicles have been able to pass in accordance with a plurality of pieces of travel data. After Step S204, the ECU 26 ends this processing.

In Step S205, the use mode control unit 154 stops transmitting, via the transmission/reception unit 21, the travel data acquired by the acquisition unit 151 to the external device (for example, the control device 1 in the first embodiment) that generates map information of a road on which vehicles have been able to pass in accordance with a plurality of pieces of travel data. In this case, the use mode control unit 154 may delete the travel data acquired by the acquisition unit 151 from the recorder 25. After Step S205, the ECU 26 ends this processing.

According to the second embodiment described above, in a case where the determination unit 153 determines that the vehicle 2 observes the traffic rules, the use mode control unit 154 transmits the travel data acquired by the acquisition unit 151 via the transmission/reception unit 21 to the external device that generates the map information of the road on which the vehicles have been able to pass in accordance with the plurality of pieces of travel data. As a result, it is possible to transmit the travel data that observes the traffic rules.

Also, in the first and second embodiments, the "unit" described above can be replaced with a "circuit" or the like. For example, the control unit can be replaced with a device control circuit.

In addition, the program to be executed by the control unit 15 or the ECU 26 according to the first and second embodiments is file data in an installable format or an executable format, and is provided by being stored in a computer-readable storage medium such as a CD-ROM, a flexible disk (FD), a CD-R, a digital versatile disk (DVD), a USB medium, and a flash memory.

In addition, the program to be executed by the control unit 15 or the ECU 26 according to the first and second embodiments may be provided by being stored in a computer connected to a network such as the Internet and being downloaded via the network.

Note that, in the description of the flowcharts in the present specification, the order of processing between steps is clearly indicated using expressions such as "first", "thereafter", and "subsequently", but the order of processing required to carry out each of the present embodiments is not uniquely determined by these expressions. That is, the order of processing in the flowcharts described in the present specification can be changed within a range without inconsistency.

Further effects and modifications can easily be derived by those skilled in the art. The broader aspects of the present disclosure are not limited to the specific details and representative embodiments presented and described above. Accordingly, various changes may be made without departing from the spirit or scope of the general concept as defined by the appended claims and their equivalents.

Although some of the embodiments of the present application have been described in detail with reference to the drawings, these are merely examples, and the present disclosure can be carried out in other forms subjected to various modifications and improvements based on the knowledge of those skilled in the art, including the aspects described in the disclosure of the present disclosure.

The present disclosure provides an effect of being able to obtain a route that allows traveling under the condition that the traffic rules are observed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device comprising:
   a processor, wherein the processor is configured to:
   acquire travel data of a target vehicle,
   determine whether the target vehicle obeys a traffic rule, and
   adjust a usage form of the travel data in a case of determining that the target vehicle does not obey the traffic rule,
   in a case of determining that the target vehicle does not obey the traffic rule, as the usage form, not accept the travel data as data to be used for generating map information including a road on which a vehicle different from the target vehicle can travel,
   delete the travel data of the target vehicle in response to the target vehicle not obeying the traffic rule, and
   generate the map information that includes the road that the target vehicle travels in accordance therewith and control traveling of the target vehicle to travel in accordance with the road, the map information including an unregistered road and a passable road at a time of an incident on the basis of the travel data of the target vehicle,
   wherein the control device is arranged in the target vehicle.

2. The control device according to claim 1, wherein, in the case of determining that the target vehicle does not obey the traffic rule, as the usage form, the processor stops transmitting the travel data to an external device.

3. The control device according to claim 1, wherein the travel data further includes at least image data obtained by imaging a view in a traveling direction of the target vehicle, and
   wherein the processor is configured to:
   detect at least one of a sign and a signboard indicating the traffic rule by performing image analysis on the image data, and
   determine whether the target vehicle obeys the traffic rule on a basis of a detection result of at least one of the sign and the signboard.

4. The control device according to claim 3, wherein the travel data further includes at least positional information of the target vehicle, and
   wherein the processor is configured to;
   acquire other vehicle travel data groups for a plurality of other vehicles,
   determine whether a number of traveling vehicles that have traveled on a route traveled by the target vehicle is a predetermined number or more on a basis of the travel data and the other vehicle travel data groups, and
   determine that the target vehicle obeys the traffic rule in a case of determining that the number of the traveling vehicles is the predetermined number or more.

5. The control device according to claim 4, wherein the travel data further includes at least identification information that identifies the target vehicle, and
   wherein the processor is configured to;
   acquire violation history information indicating a violation history associated with the identification information,
   determine whether the number of the violation histories is a predetermined number of times or more, and
   determine that the target vehicle does not obey the traffic rule, if it is determined that a number of violation histories is the predetermined number of times or more in a case of determining that the number of the vehicles that have traveled on the road is not the predetermined number or more.

6. The control device according to claim 3, wherein the processor is configured to;
   acquire map data,
   determine whether the target vehicle travels on a public road on a basis of the map data and the travel data, and
   determine that the target vehicle obeys the traffic rule in a case of determining that the target vehicle travels on the public road.

7. The control device according to claim 6, wherein the travel data further includes at least identification information that identifies the target vehicle, and
   wherein the processor is configured to:
   acquire other vehicle travel data groups of a plurality of different vehicles and violation history information indicating violation histories associated with the identification information,
   determine whether a number of traveling vehicles that have traveled on a route traveled by the target vehicle is a predetermined number or more on a basis of the travel data and the other vehicle travel data groups,
   determine whether the traveling vehicle is the target vehicle on a basis of the identification information in a case of determining that the number of the traveling vehicles is the predetermined number or more,
   determine whether a number of the violation histories of the target vehicle is less than a predetermined number of times in a case of determining that the traveling vehicle is the target vehicle, and
   determine that the target vehicle travels on the public road in a case of determining that the number of the violation histories of the target vehicle is less than the predetermined number of times and determine that the target vehicle travels on a private road in a case of determining that the number of the violation histories of the target vehicle is not less than the predetermined number of times.

8. The control device according to claim 1, wherein, in a case where it is determined that the target vehicle obeys the traffic rule, the map information is generated on the basis of the travel data.

9. A non-transitory computer-readable recording medium storing a program that causes a processor to:
acquire travel data of a target vehicle,
determine whether the target vehicle obeys a traffic rule,
adjust a usage form of the travel data in a case of determining that the target vehicle does not obeys the traffic rule,
in a case of determining that the target vehicle does not obey the traffic rule, as the usage form, not accepting the travel data as data to be used for generating map information including a road on which a vehicle different from the target vehicle can travel,
deleting the travel data of the target vehicle in response to the target vehicle not obeying the traffic rule, and
generating the map information that includes the road that the target vehicle travels in accordance therewith and controlling traveling of the target vehicle to travel in accordance with the road, the map information including an unregistered road and a passable road at a time of an incident on the basis of the travel data of the target vehicle,
wherein the control device is arranged in the target vehicle.

10. A data generation method performed by a processor, comprising:
acquiring travel data of a target vehicle;
determining whether the target vehicle obeys a traffic rule;
adjusting a usage form of the travel data in a case of determining that the target vehicle does not obey the traffic rule;
in a case of determining that the target vehicle does not obey the traffic rule, as the usage form, not accepting the travel data as data to be used for generating map information including a road on which a vehicle different from the target vehicle can travel;
deleting the travel data of the target vehicle in response to the target vehicle not obeying the traffic rule; and
generating the map information that includes the road that the target vehicle travels in accordance therewith and controlling traveling of the target vehicle to travel in accordance with the road, the map information including an unregistered road and a passable road at a time of an incident on the basis of the travel data of the target vehicle,
wherein the control device is arranged in the target vehicle.

* * * * *